US010264474B2

United States Patent
Varga et al.

(10) Patent No.: US 10,264,474 B2
(45) Date of Patent: Apr. 16, 2019

(54) METHOD, A NODE, COMPUTER PROGRAM AND COMPUTER PROGRAM PRODUCT FOR ADAPTING RADIO COORDINATION SCHEMES

(71) Applicant: Telefonaktiebolaget L M Ericsson (publ), Stockholm (SE)

(72) Inventors: Balazs Varga, Budapest (HU); Mats Forsman, Ronninge (SE); Shahryar Khan, Ronninge (SE); Lars Peter Pehrson, Sollentuna (SE); Tomas Thyni, Jarfalla (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 303 days.

(21) Appl. No.: 14/410,467

(22) PCT Filed: Feb. 14, 2014

(86) PCT No.: PCT/SE2014/050188
§ 371 (c)(1),
(2) Date: Dec. 22, 2014

(87) PCT Pub. No.: WO2015/122817
PCT Pub. Date: Aug. 20, 2015

(65) Prior Publication Data
US 2016/0269916 A1 Sep. 15, 2016

(51) Int. Cl.
*H04W 24/02* (2009.01)
*H04W 8/00* (2009.01)
(Continued)

(52) U.S. Cl.
CPC .......... *H04W 24/02* (2013.01); *H04W 8/005* (2013.01); *H04W 64/006* (2013.01); *H04W 24/04* (2013.01)

(58) Field of Classification Search
CPC ........ H04B 7/00; H04W 72/08; H04W 72/15; H04W 16/14; H04M 2250/00
See application file for complete search history.

(56) References Cited

U.S. PATENT DOCUMENTS 9,237,532 B2 * 1/2016 Kazmi .................. H04W 36/30
9,578,517 B2 * 2/2017 De Pasquale ......... H04W 16/14
(Continued)

FOREIGN PATENT DOCUMENTS

CN     101917381 A    12/2010
CN     103299671 A     9/2013
(Continued)

OTHER PUBLICATIONS

"LTE; Evolved Universal Terrestrial Radio Access (E-UTRA) and Evolved Universal Terrestrial Radio Access Network (E-UTRAN); Overall description; Stage 2", *ETSI TS 136 300 V12.3.0; 3GPP TS 36.300 V12.3.0*, (Sep. 2014), 230 pages.
(Continued)

*Primary Examiner* — Xavier Szewai Wong
(74) *Attorney, Agent, or Firm* — Nicholson De Vos Webster & Elliott LLP (57) ABSTRACT

The present invention relates to a method and embodiments thereof in a Radio Node, a node, computer program and computer program products for adapting of Radio Coordination schemes to transport network characteristics. The method comprises detecting new neighbours, retrieving transport characteristics values between radio neighbours, validity checking of the active Radio Coordination scheme(s), and updating of Radio Coordination scheme, if necessary, based on the measured transport characteristics values.

18 Claims, 7 Drawing Sheets

(51) Int. Cl.
  *H04W 64/00* (2009.01)
  *H04W 24/04* (2009.01)

(56) References Cited

U.S. PATENT DOCUMENTS

| | | | |
|---|---|---|---|
| 2004/0066777 A1* | 4/2004 | Vesterinen | H04L 45/02 370/352 |
| 2006/0045117 A1 | 3/2006 | Qi et al. | |
| 2007/0105561 A1* | 5/2007 | Doetsch | H04W 72/082 455/450 |
| 2007/0115905 A1* | 5/2007 | Jokela | H04L 1/1607 370/338 |
| 2007/0286122 A1* | 12/2007 | Fonseca | H04L 1/0021 370/329 |
| 2009/0233635 A1* | 9/2009 | Li | H04B 7/0682 455/509 |
| 2009/0316585 A1 | 12/2009 | Srinivasan et al. | |
| 2010/0290352 A1* | 11/2010 | Oyman | H04W 74/0808 370/252 |
| 2011/0021153 A1* | 1/2011 | Safavi | H04B 7/0434 455/63.1 |
| 2011/0098072 A1 | 4/2011 | Kim et al. | |
| 2011/0136494 A1 | 6/2011 | Kim et al. | |
| 2012/0243584 A1* | 9/2012 | Honda | H04B 7/0811 375/219 |
| 2012/0282966 A1 | 11/2012 | Koo et al. | |
| 2013/0088986 A1* | 4/2013 | Xiao | H04W 72/0426 370/252 |
| 2014/0293914 A1* | 10/2014 | Maattanen | H04W 72/1278 370/329 |
| 2014/0337490 A1* | 11/2014 | Zhao | H04L 41/046 709/220 |
| 2015/0146519 A1* | 5/2015 | Zakrzewski | H04W 8/30 370/221 |
| 2015/0334202 A1* | 11/2015 | Frydman | H04L 12/189 370/328 |

FOREIGN PATENT DOCUMENTS

| | | |
|---|---|---|
| CN | 103476105 A | 12/2013 |
| EP | 2811776 A1 | 12/2014 |
| WO | 2012120077 A1 | 9/2012 |
| WO | 2013113266 A1 | 8/2013 |

OTHER PUBLICATIONS

PCT International Search Report for PCT Counterpart Application No. PCT/SE2014/050188, (Nov. 20, 2014), 4 pp.
R1-130374, 3GPP Draft: "Discussion on interference characteristics and evaluation assumptions for various small cell scenarios", NEC Group, (Jan. 28 - Feb. 1, 2013), 4 pp.
R1-135493, 3GPP Draft: "Considerations on network coordination and signaling for Naics", Lg Electronics, (Nov. 11-15, 2013), 4 pp.
R1-140367, 3GPP Draft: "Overview of small cell on/off scenarios and procedures", Samsung, (Feb. 10-14, 2014), 11 pp.
Written Opinion of the International Searching Authority, Application No. PCT/SE2014/050188, dated Nov. 20, 2014, 8 pages.
Written Opinion of the International Preliminary Examining Authority, Application No. PCT/SE2014/050188, dated Feb. 9, 2016, 8 pages.
Written Opinion of the International Preliminary Examining Authority, Application No. PCT/SE2014/050188, dated Apr. 26, 2016, 8 pages.
International Preliminary Report on Patentability, Application No. PCT/SE2014/050188, dated Jun. 21, 2016, 7 pages.
First Office Action and Search report from foreign counterpart Chinese Patent Application No. 201480075510.3, dated Oct. 12, 2018, 11 pages (Translation available only for office action).

* cited by examiner

METHOD, A NODE, COMPUTER PROGRAM AND COMPUTER PROGRAM PRODUCT FOR ADAPTING RADIO COORDINATION SCHEMES

CROSS-REFERENCE TO RELATED APPLICATIONS

This application is a National stage of International Application No. PCT/SE2014/050188, filed Feb. 14, 2014, which is hereby incorporated by reference.

TECHNICAL FIELD

The present technology relates to a method, a node, computer program and computer program product for adapting Radio Coordination schemes in a communication network for wireless communication, especially in transport network.

BACKGROUND

Radio Coordination schemes (where COMP, Co-Ordinated Multi Point is one set of Radio coordination) puts additional challenges on the transport network as it puts requirements on transport characteristics, e.g. bandwidth, delay, jitter, sync accuracy, etc. Depending on the characteristics of the transport network, influenced by e.g. transport network topology, the specific radio-coordination schemes between participating Radio Nodes may or may not be possible. Each individual coordination function is a radio coordination scheme. A radio coordination scheme is a radio coordination function, which is similar to a radio coordination feature.

Radio Coordination schemes that has similar transport characteristics requirements can be grouped. Within a group, the Radio Coordination schemes work within a transport characteristics range, but some radio coordination schemes needs tuning within the range, but outside the characteristics range a different group of Radio Coordination schemes need to be selected.

One problem arises when the transport characteristics for a Radio Coordination scheme is "out of range", the radio performance gain is none or can even be negative i.e. the radio performance with Radio Coordination active is less than without it. Therefore Radio Coordination scheme related configuration of Radio Nodes need careful design. However such a design is quite complicated as Radio Coordination relation between neighbouring Radio Nodes are quite dynamic. Neighbouring radio nodes (RBS) are nodes that a single UE can hear, e.g. located between at least two RBSes.

An existing solution for Radio Coordination schemes is static pre-configuration of them. Static pre-configuration of Radio Coordination schemes in Radio Nodes per neighbour relationship means that transport characteristics needs to be known and defined in advance and thus set with such a margin that it avoids to be out-of range. Thus it is not possible to follow transport network characteristics changes and optimize Radio Coordination scheme configuration on the fly.

SUMMARY

The object of the following disclosure is to provide a solution of the problem how to select and/or adapt the configuration of Radio Coordination schemes to transport network characteristics for maximizing radio performance.

This object is achieved by a method and embodiments thereof. The method enables adaption of Radio Coordination schemes to transport network characteristics. The method comprises steps of detecting new neighbours, retrieving transport characteristics values between radio neighbours, validity checking of the active Radio Coordination scheme(s), and updating of Radio Coordination scheme, if necessary, based on the measured transport characteristics values.

Different embodiments of said method are disclosed in the description and independent claims.

The object is also achieved by a node and embodiments thereof. The node enables adaption of Radio Coordination schemes to transport network characteristics. The node comprises processing circuitry operative to detect new neighbours, to retrieve transport characteristics values between radio neighbours, to validity check the active Radio Coordination scheme, and to update the Radio Coordination scheme, if necessary, based on the measured transport characteristics values.

Different embodiments of said node are disclosed in the description and independent claims.

It is also provided computer program and computer program products and embodiments thereof. The computer program comprises computer program code which, when run in a processor circuitry of a node, causes the node to perform the different embodiments of the above stated method for enabling adaption of Radio Coordination schemes to transport network characteristics. The computer program product comprises said computer program and a computer readable means on which the computer program is stored.

It is further provided a carrier containing the computer program, wherein the carrier is one of an electronic signal, optical signal, radio signal or computer readable storage medium.

One advantage is that the method gives a solution for automatic Radio Coordination (i) selection and/or (ii) (re) configuration of Radio coordination settings. Further, the method can ensure best customer quality of experience, i.e. maximized radio performance for a given transport network design and network characteristics through Radio Coordination schemes adaptation to changes in transport network characteristics.

BRIEF DESCRIPTION OF THE DRAWINGS

The foregoing, and other, objects, features and advantages of the present invention will be more readily understood upon reading the following detailed description in conjunction with the drawings in which.

DETAILED DESCRIPTION

In the following description, for purposes of explanation and not limitation, specific details are set forth, such as particular circuits, circuit components, techniques, etc. in order to provide a thorough understanding of the present invention. However, it will be apparent to one skilled in the art that the present invention may be practiced in other embodiments that depart from these specific details. In other instances, detailed descriptions of well-known methods, devices, and circuits are omitted so as not to obscure the description of the present invention with unnecessary detail.

The object of the following disclosure is to provide a solution of the problem how to select and/or adapt the configuration of Radio Coordination schemes to transport network characteristics. This will be done together with the existing Radio resource management based selections of schemes.

The basic idea is that the Radio Node adapts to the transport networks characteristics of the connection between neighbouring radio nodes.

The Radio Node gets information from different sources and source locations about transport network characteristics for its Radio Coordination relations either:

(i) via its own measurement; or
(ii) the characteristics are provided by the transport network node(s); or
(iii) the characteristics are provided by a separate measuring node
(iv) the characteristics are provided by a management node
(v) the characteristics are provided by a control node.

Periodic measurement can ensure adaptation/selection of Radio Coordination schemes to changes in the transport network.

Figure 1:
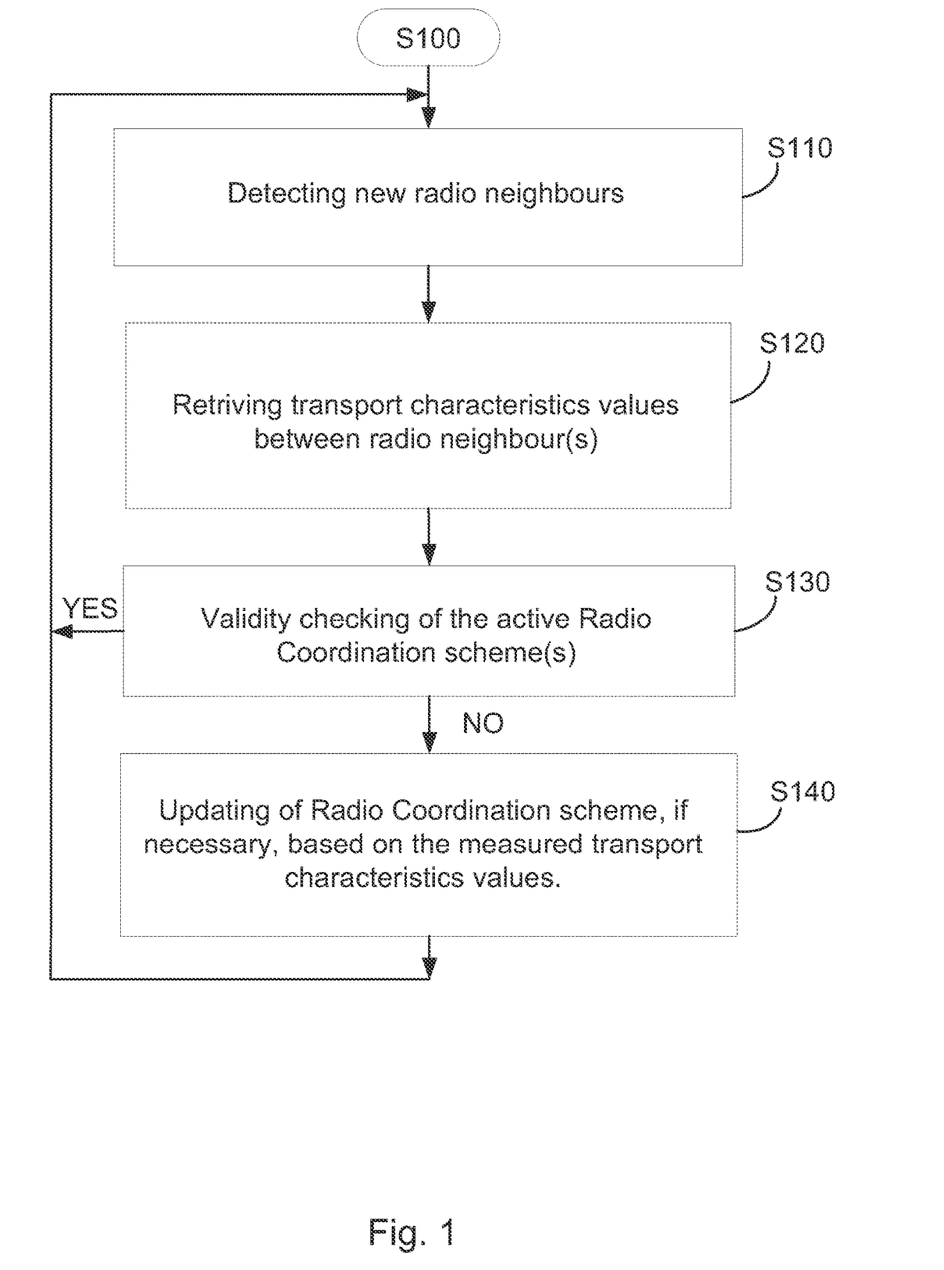
FIG. 1 is a flowchart illustrating one example of a method.

FIG. 1 is a flowchart illustrating an example of a method in a Radio Node. Said method provides adaption of Radio Node Radio Coordination schemes to transport network characteristics. The example comprises following steps:

S110:—Detecting new neighbours. The Radio Node detects and reacts when new radio neighbours have been discovered by using ANR and at least one neighbour being a target for Radio Coordination scheme functionality.

S120:—Retrieving transport characteristics values between radio neighbour(s). Transport characteristics values between radio neighbour(s) are retrieved, e.g. by using active measurement to/from the radio node, or via information from e.g. transport nodes, or from a separate measurement node. A transport node may be any node, such as Ethernet switches, routers, etc., transporting data from the Radio Base Station site. The Radio Node may further ask, e.g. by sending request messages to connected transport node(s) or another system to provide the transport characteristics towards the Radio Coordination neighbours.

Radio Coordination neighbours are the neighbouring radio nodes (RBS) that a single UE can hear and there are possibilities to run radio coordination between these two RBS nodes.

Figure 2:
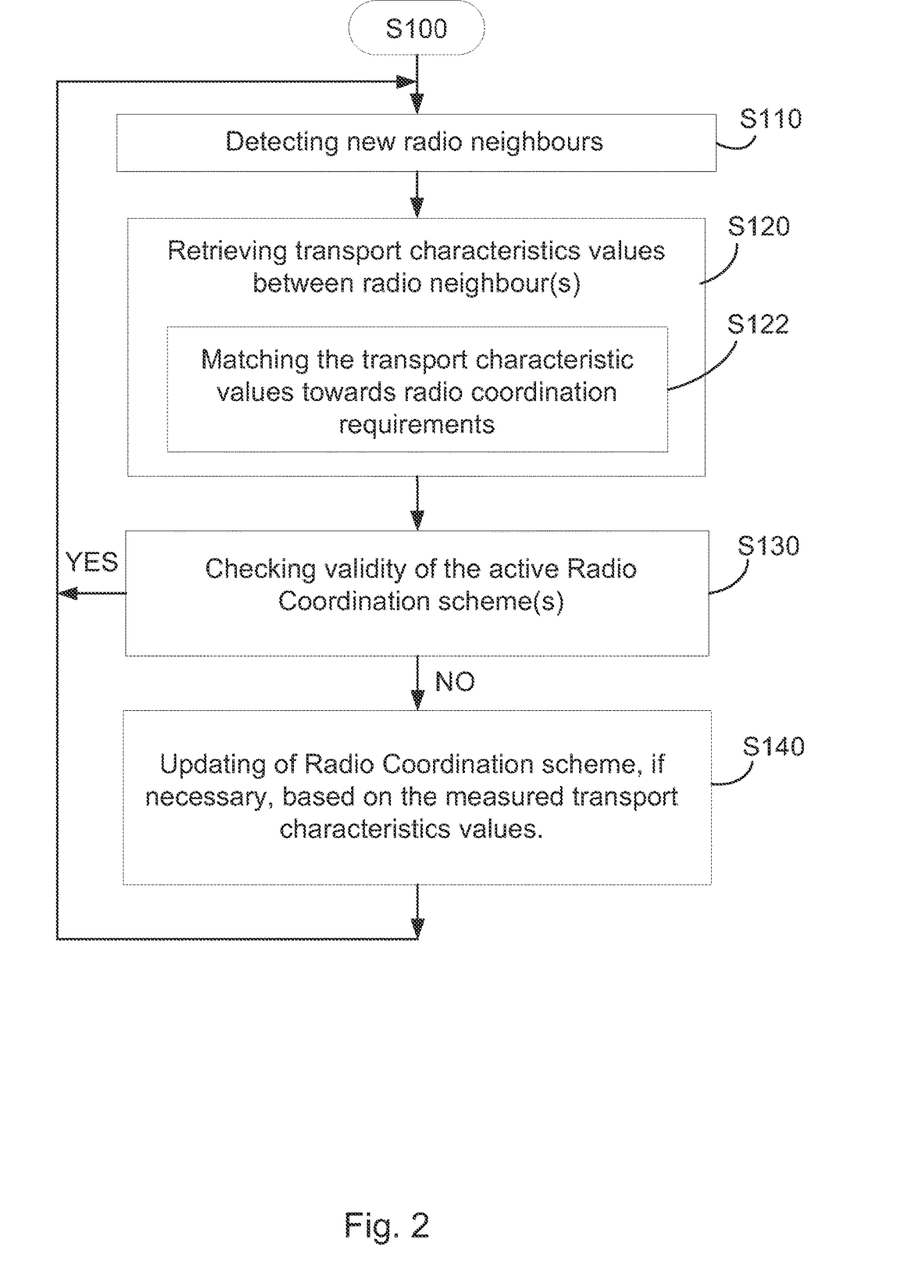
FIG. 2 is a flowchart illustrating an embodiment of the exemplified method in FIG. 1.
Figure 3:
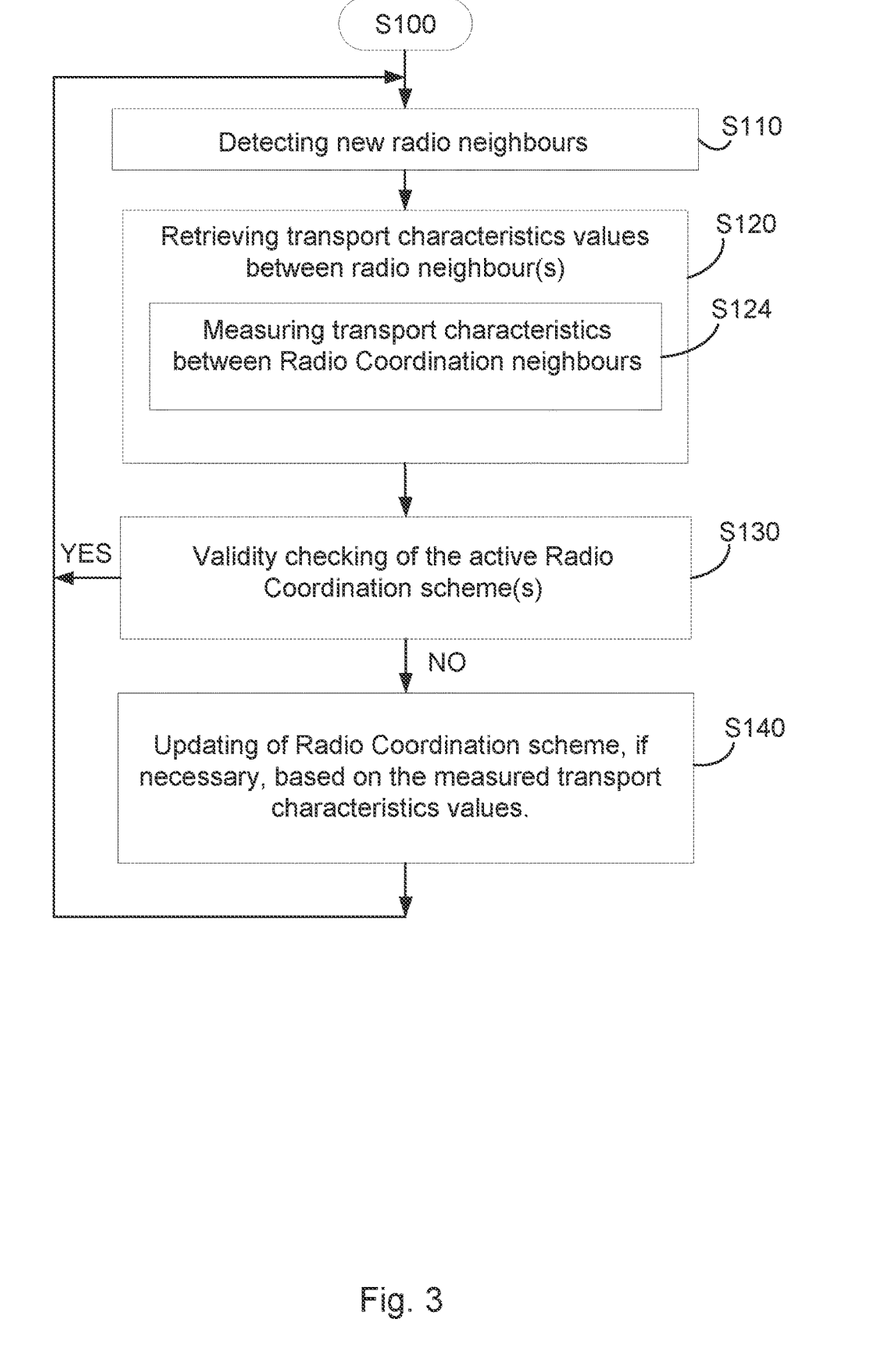
FIG. 3 is a flowchart illustrating further one embodiment of the exemplified method in FIG. 1.

Different alternatives of step S120 are presented in FIGS. 2 and 3.

Step S120 is followed by step S130.

S130:—Validity checking of the active Radio Coordination scheme(s). There can also be one or more active scheme at the time. How do we handle this using scheme(s) or describe this in the beginning "the term scheme is used to name one or more schemes". The exemplified method in FIG. 1 involves a test in S130 whether the active Radio Coordination scheme(s) is the optimal scheme(s), e.g. can better scheme(s) be selected, or characteristics are out of range so a different scheme must be selected, or user is moved out of reach for coordination from one/several neighbouring nodes.

If validity check is positive, i.e. measured transport characteristics values are within the range and optimal scheme(s) is/are used, then the method returns to step S110. If validity check is negative, i.e. measured transport characteristics values are out of range, or the optimal scheme(s) is/are not used, then the method executes step S140. An optimal scheme is a scheme providing maximal performance and/or performance improvement.

Figure 4:
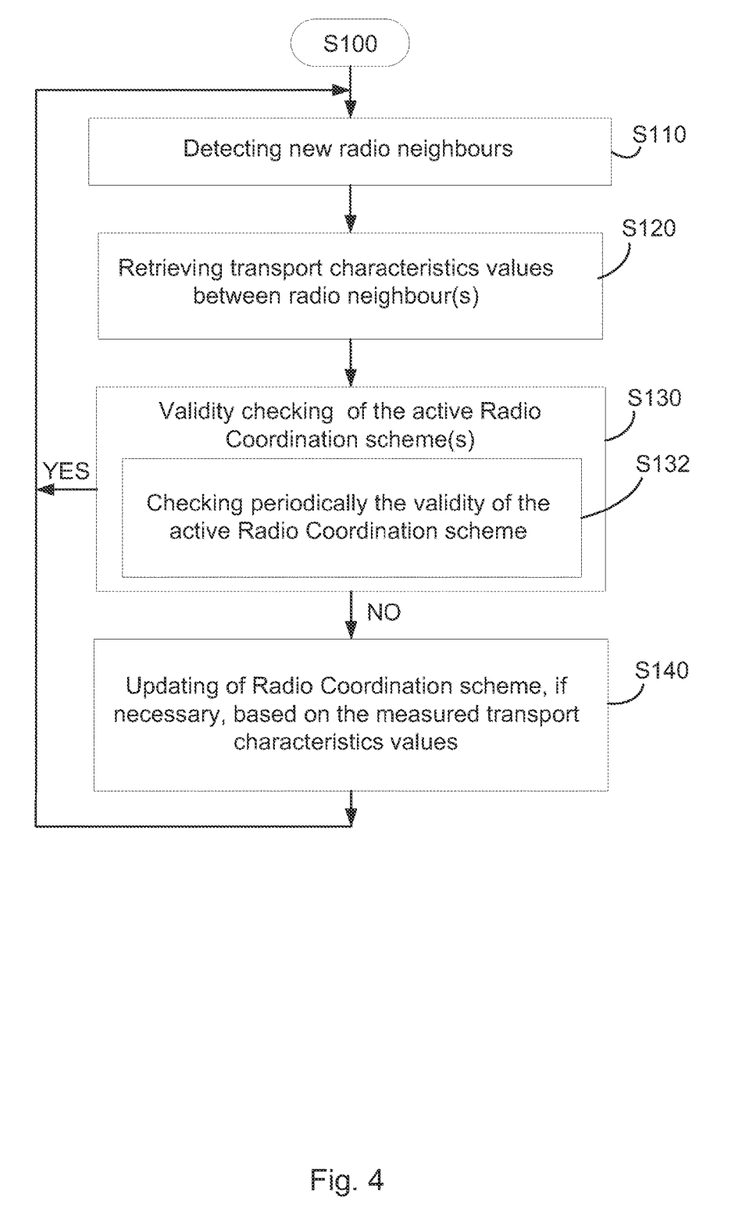
FIG. 4 is a flowchart illustrating further an embodiment of the exemplified method in FIG. 1.

An alternative step S130 is presented in FIG. 4.

S140:—Updating of Radio Coordination scheme, if necessary, based on the measured transport characteristics values.

In this step, the Radio Node is configured to update the Radio Coordination scheme(s) to be active during the following period, if necessary. The updating may be performed in different ways. The Radio Nodes may either (i) select a Radio Coordination scheme(s) to be active and/or (ii) (re)configure the active Radio Coordination scheme(s) according to the transport characteristics values, or remove Radio Coordination scheme. Configuration and/or selection of Radio Coordination function(s) can be a local decision of the Radio Node or by involving a remote entity, e.g. management, etc. The selected Radio Coordination scheme depends on relevant transport characteristics, e.g. bandwidth, delay, jitter, sync accuracy etc.

One example is if transport network characteristics changes are within the valid range for a specific Radio Coordination scheme/Radio Coordination scheme group, then only reconfiguration of the active scheme is necessary.

Step S140 may involve a dampening function with hysteresis for modifying Radio Coordination scheme settings or change of Radio Coordination method. Modification of Radio Coordination scheme settings or change of Radio Coordination method includes a dampening function with hysteresis to avoid oscillation between and within Radio Coordination schemes.

Figure 5:
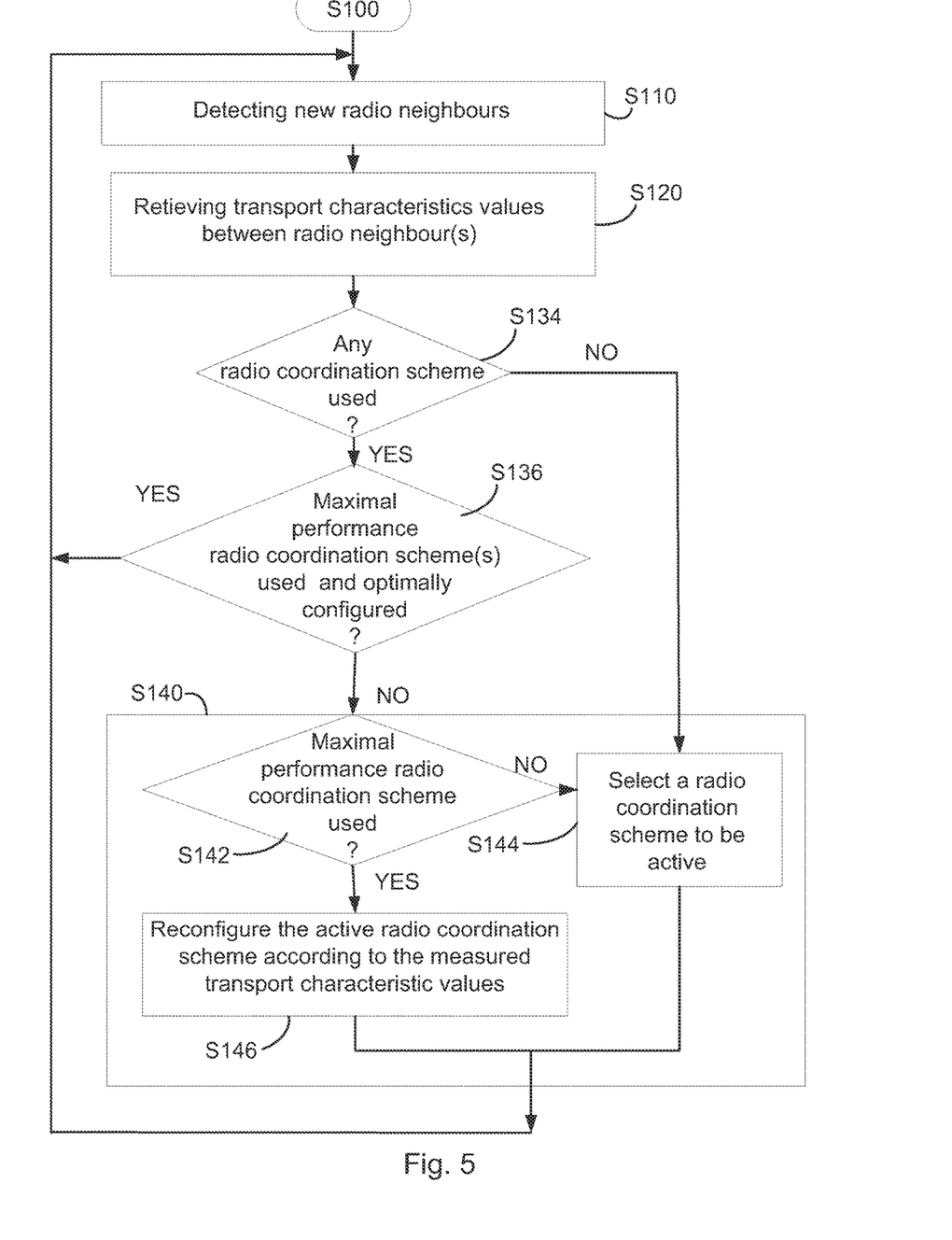
FIG. 5 is a flowchart illustrating just another embodiment of the exemplified method in FIG. 1.

An embodiment of the method is presented in FIG. 5, wherein an alternative implementation of step 140 is presented.

FIG. 2 is a flowchart illustrating an embodiment of the exemplified method in FIG. 1.

The embodiment comprises an alternative step S120 that involves step S122:—Matching the transport characteristic values towards radio coordination requirements. The Radio Node may be provided by or retrieved from a measurement client that checks and matches the transport characteristics towards the Radio Coordination requirements.

According to another embodiment, illustrated in the flowchart of FIG. 3, step S120 involves:

S124:—Measuring transport characteristics between Radio Coordination neighbours. Transport characteristics values between radio neighbour(s) are measured, e.g. by using active measurement to/from the radio node, or via information from e.g. transport nodes, or from a separate measurement node.

FIG. 4 is a flowchart illustrating another embodiment of the exemplified method in FIG. 1.

The embodiment comprises an alternative step S130 that involves step 132. According to embodiment, step S130 involves:

S132:—Checking periodically the validity of the active Radio Coordination scheme. Measured transport characteristics in the transport network may be checked whether they are in the range set by the scheme. Thus, the transport characteristics may be measured periodically in order to be able to update by selecting and/or adapting Radio Coordination schemes. When the transport characteristics towards the Radio Coordination neighbours are measured, as in step S122, said measured values are used in the check. The Radio Node may be provided with a measurement client that checks the transport characteristics towards the Radio Coordination neighbours.

An alternative step S130 involving step S134 is presented in FIG. 5.

FIG. 5 is a flowchart illustrating another embodiment of the exemplified method in FIG. 1.

The embodiment comprises an alternative step S130 that involves step S134 and S136 and an example of an implementation of S140.

According to said embodiment, step S130 involves:

S134:—Any radio coordination scheme used?

S136:—Maximal performance radio coordination scheme(s) used and optimally configured As stated above, measured transport characteristics in the transport network may be checked whether they are in the range set by the scheme. Thus, the transport characteristics may be measured periodically in order to be able to update by selecting and/or adapting Radio Coordination schemes. If validity check is positive, "YES", i.e. measured transport characteristics values are within the range and the optimal scheme offering maximal performance is used and configured, then the method returns to step S110. If validity check is negative, "NO", i.e. measured transport characteristics values are out of range, and/or maximal performance scheme is not used or optimally configured, then the method executes step S140.

First is a test performed in S142:—Maximal performance Radio Coordination scheme used?

If transport network characteristics values are "out of range" for a specific Radio Coordination scheme/Radio Coordination scheme group, then the test is negative, "NO", a new Radio Coordination scheme from another Radio Coordination scheme group need to (or can) be selected, which is performed in step S144:

S144:—Select a Radio Coordination scheme to be active.

The currently active Radio Coordination scheme may be to remove for a new selected Radio coordination Scheme, or to continue without any radio coordination.

If transport network characteristics changes are within the valid range for a specific Radio Coordination scheme/Radio Coordination scheme group, then only reconfiguration of the active scheme is necessary. Then the test is positive, "YES", and step S146 is performed:

S146:—Reconfigure the active Radio Coordination scheme according to the measured transport characteristic values. Thus, the values of the active Radio Coordination scheme are updated according to the currently measured values.

When S140 has been performed, the method returns to step S110.

The method and its embodiments may be implemented in digital electronically circuitry, or in computer hardware, firmware, software, or in combinations of them. Apparatus may be implemented in a computer program product tangibly embodied in a machine readable storage device for execution by a programmable processor; and method steps may be performed by a programmable processor executing a program of instructions to perform functions of the provided methods and nodes by operating on input data and generating output.

The provided methods and nodes may advantageously be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language.

Generally, a processor will receive instructions and data from a read-only memory and/or a random access memory. Storage devices suitable for tangibly embodying computer program instructions and data include all forms of non-volatile memory, including by way of example semiconductor memory devices, such as EPROM (erasable programmable read only memory), EEPROM (electrically erasable programmable read only memory), and flash memory devices; magnetic disks such internal hard disks and removable disks; magneto-optical disks; and CD-ROM (Compact Disc Read-Only Memory) disks. Any of the foregoing may be supplemented by, or incorporated in, specially -designed ASICs (Application Specific Integrated Circuits).

Figure 6:
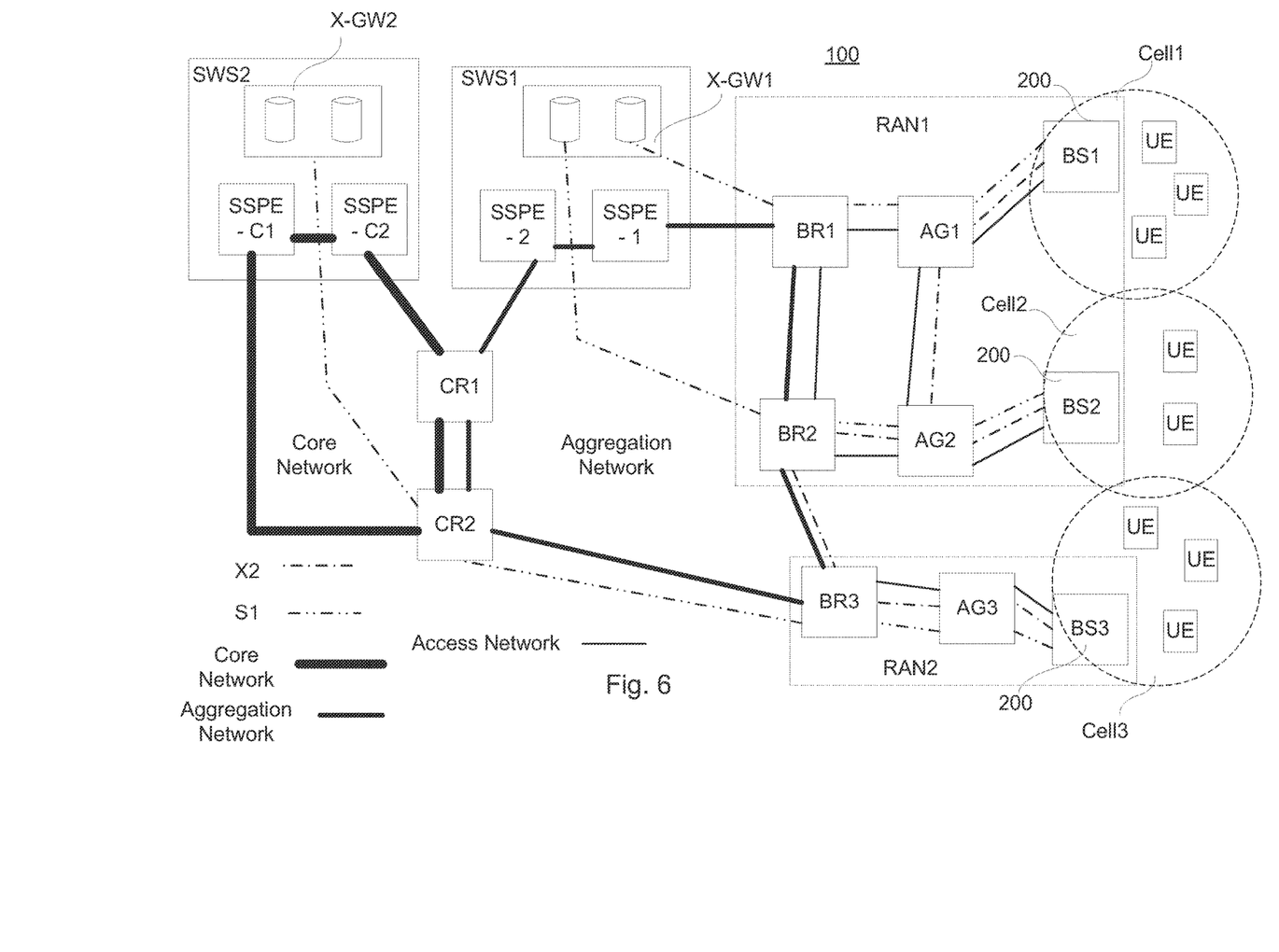
FIG. 6 is a block diagram illustrating an example of a transport telecommunications network.

FIG. 6 is a block diagram illustrating an example of a transport telecommunications network.

The exemplified transport telecommunications network 100 is logically divided into a radio access network (RAN), aggregation network and core network CN.

A RAN is that part of a telecommunications network which connects subscribers to their immediate service provider. It is contrasted with the core network, e.g. the Network Switching Subsystems, which connects local providers to each other. A RAN is part of a mobile telecommunication system. It implements a radio access technology. Conceptually, it resides between a device such as a mobile phone, and a computer or any remotely controlled machine for providing connection with its core network (CN). Depending on the standard, mobile phones and other wireless connected devices are varyingly known as user equipment (UE), terminal equipment, mobile station (MS), etc. See the following diagram:

Examples of radio access network types are:
GRAN: GSM radio access network;
GERAN: essentially the same as GRAN but specifying the inclusion of EDGE packet radio services;
UTRAN: UMTS radio access network;
E-UTRAN: The Long Term Evolution (LTE) high speed and low latency radio access network;
CDMA2000
Wi-Fi
WiMAX It is also possible for a single handset/phone to be simultaneously connected to multiple radio access networks. Handsets capable of this are sometimes called dual-mode or multi-mode handsets. For instance it is common for handsets to support both WIFI, GSM and UMTS ("3G") radio access technologies. Such devices seamlessly transfer an ongoing call between different radio access networks without the user noticing any disruption in service.

A radio access network 100 involves one or more base station, BS, nodes 200, e.g. eNB, NodeB, BTS. One of the biggest changes in LTE topology is the introduction of X2 traffic, where intelligent base stations can transmit information directly to one another, rather than communicating solely with the core network. The backhaul traffic for eNB contains user data for one or more cells, plus traffic forwarded over the X2 interface during handovers, plus overheads for transport protocols and security. X2 traffic is supposed to make handover and rapid coordination of radio resources faster and more efficient by placing the intelligence at the base stations, rather than the core. The X2 interfaces are indicated as dot-dashed line.

The eNB is connected to the core network using S1 interface. The S1 interfaces are indicated as double dot-dashed line.

As mentioned one basic idea is that the radio node adapts to the transport network's characteristics of the connection between neighbouring nodes. The network path may be the same as X2, but some coordination features uses the logical X2 for the functionality, and others use a different logical interface. The network path can pass multiple switches and routers in the network. In most networks today it goes all the way up to the switching/RNC site, and back out again even if the RBSes are located across the street.

In the example of FIG. 6, the transport telecommunications network comprises access networks RAN1 and RAN2. RAN1 comprises a BS1 that is an eNB serving a number of user equipment UE in a cell Cell1. RAN1 further comprises aggregation nodes AG1 and AG2, and routers BR1 and BR2. RAN1 further comprises a BS2 that may be an eNB serving a number of user equipment UE in a cell Cell2. RAN2 comprises a BS3 that is an eNB serving a number of user equipment UE in a cell Cell3.

Base stations BS1 and BS2 are connected within RAN1 via an interface X2 involving aggregation points AG1 and AG2. The base station BS3 in RAN2 is connected to the base stations of RAN1 via interface X2 involving aggregation point AG3 and router BR3.

The aggregation network comprises routers BR1, BR2 and BR3, switching site SWS1 with gateway X-GW1, SSPE-1 and SSPE-2, and core routers CR1 and CR2.

The Core Network, CN, comprises core routers CR1 and CR2 and switching site SWS2 with gateway X-GW2, SSPE-C1 and SSPE-C2.

Figure 7:
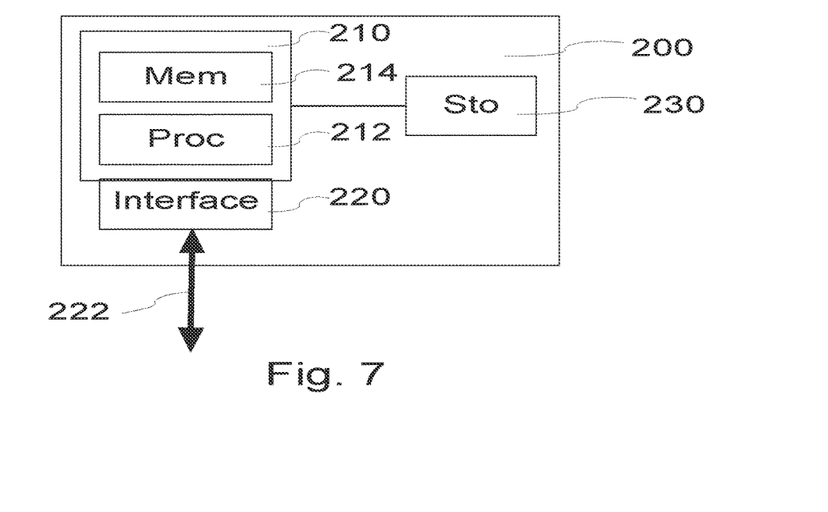
FIG. 7 is a block diagram illustrating one embodiment of a node of a transport telecommunications network.

SW1 is a traditional switch site where the RNC/BSC is located today. SW2 is a traditional core site with PDN-GW, MME etc FIG. 7 is a block diagram illustrating one example of a node, preferably a radio node in a communications network, e.g. wireless communications network or telecommunications network. Said node 100 is configured to adapt Radio Coordination schemes to transport network characteristics. The node comprises at least one processing circuitry 210 comprising a processor unit 212 and a memory storage 214. The node 200 further comprises an interface 220 for enabling input and output communication 222 with other nodes, etc. The node 200 may also comprise computer readable means or computer readable storage medium 230 on which the computer program is stored. Said means or medium 230 may be fixed in the node or removable.

It is understood that said may comprise a different number of computer readable means or computer readable storage medium 230, and the illustrated number of computer readable means or computer readable storage medium 230 only is for illustrative purposes. One or several of the computer readable means or computer readable storage medium 230 may be physically separated from the other computer readable means or computer readable storage medium 230, or may reside on the same physical media.

Said processing circuitry 210 causes the node to perform the steps of the above described method S100 and embodiments thereof. Thus, the processing circuitry 210 of the node 200 is adapted to and operative to detect new neighbours, to retrieve transport characteristics values between radio neighbours, to validity check the active Radio Coordination scheme, and to update the Radio Coordination scheme, if necessary, based on the measured transport characteristics values.

The node 200 may be adapted, e.g. by means of the processing circuitry 210, to measure the transport characteristics between the Radio Coordination neighbours.

The node may further be adapted, e.g. by means of the processing circuitry 210, to retrieve transport characteristics between one or more Radio Coordination neighbours, e.g. different sources and source locations:
 (i) via its own measurement; or
 (ii) the characteristics are provided by the transport network node(s); or
 (iii) the characteristics are provided by a separate measuring node
 (iv) the characteristics are provided by a management node
 (v) the characteristics are provided by a control node.

The node may further be adapted, e.g. by means of the processing circuitry 210, to check periodically the validity of the active Radio Coordination scheme.

The node may further be adapted, e.g. by means of the processing circuitry 210, to validity check by checking if any radio coordination scheme is used; and if maximal performance radio coordination scheme(s) is/are used and optimally configured.

The node may further be adapted, e.g. by means of the processing circuitry 210, to check if the maximal performance Radio Coordination scheme(s) is/are used.

The node may further be adapted, e.g. by means of the processing circuitry 210, to select a Radio Coordination scheme to be active.

The node may further be adapted, e.g. by means of the processing circuitry 210, to reconfigure the active Radio Coordination scheme according to the measured transport characteristic values.

The above mentioned embodiments may be implemented as processing circuitry 210 and a computer program comprising computer program code which, when run in a processor circuitry of a node, causes the node to perform the method steps of the method S100:
 S110:—Detecting new neighbours;
 S120:—Retrieving transport characteristics values between radio neighbours;
 S130:—Validity checking of the active Radio Coordination scheme;
 S140:—Updating of Radio Coordination scheme, if necessary, based on the measured transport characteristics values.

The computer program comprises computer program code which, when run in a processor circuitry of a node, causes the node to perform the different embodiments of the method S100.

It is further provided a computer program product comprising said computer program and a computer readable means on which the computer program is stored.

It is further provided a carrier containing the computer program, wherein the carrier is one of an electronic signal, optical signal, radio signal or computer readable storage medium.

Figure 8:
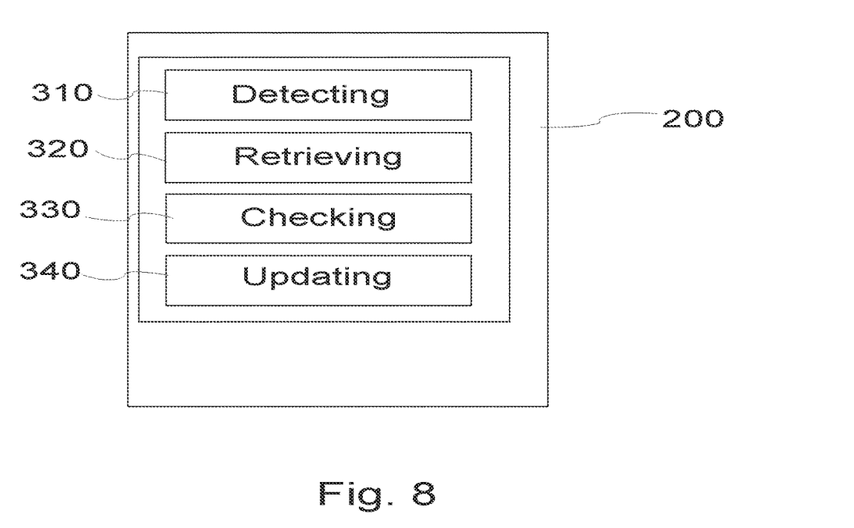
FIG. 8 is a block diagram illustrating another embodiment of a node of a transport telecommunications network.

FIG. 8 is a block diagram illustrating another example of a node, preferably a radio node in a communications network, e.g. wireless communications network or telecommunications network.

The above mentioned embodiments of the method S100 may be implemented as modules of a node 200, said modules causes the node to perform the method steps of the method S100. The node 200 may therefore comprise a first module 310 for detecting new neighbours, a second module 320 for retrieving transport characteristics values between radio neighbours; a third module 330 for validity checking the active Radio Coordination scheme, and fourth module 340 for updating of Radio Coordination scheme, if necessary, based on the measured transport characteristics values.

A node 200 may comprise further modules for implementing the different embodiments of the method S100, said modules causes the node to perform the different embodiments of the method S100.

The entities and units described above with reference to FIGS. 6, 7 and 8 may be considered as logical units, and do not necessarily correspond to separate physical units. Thus, the person skilled in the art would appreciate that the units disclosed in the FIGS. 6, 7 and 8 may be implemented as physically integrated units, and/or physically separate units, and that the units are provided with appropriate processing circuits.

A number of embodiments of the present invention have been described. It will be understood that various modifications may be made without departing from the scope of the invention. Therefore, other implementations are within the scope of the following claims defining the invention.

ABBREVIATION LIST

3GPP Third Generation Partnership Project
LTE Long Term Evolution
RAN Radio Access Network
CN Core Network
IP Internet Protocol
eNB base station in LTE system
RNC Radio Network Controller
UTRAN Universal Terrestrial Radio Access Network
BSC Base Station Controller
GERAN GSM EDGE Radio Access Network
GSM Global System for Mobile communications

The invention claimed is:

1. A method in a Radio Node for adapting Radio Coordination schemes based on transport network characteristics of a connection between neighbouring radio nodes, the method comprising:
    detecting new radio node neighbours, the radio node and radio node neighbours part of at least one radio access network providing service to at least one user equipment;
    retrieving transport network characteristics values for the connection between radio node neighbours of the at least one radio access network;
    validity checking of an active Radio Coordination scheme based on the retrieved transport network characteristics values, the Radio Coordination scheme used to coordinate communication between the radio node and radio node neighbours and the at least one user equipment; and
    in response to an outcome of the validity checking, updating the active Radio Coordination scheme based on the retrieved transport network characteristics values for the connection between the radio node neighbours.

2. The method according to claim 1, wherein the retrieving comprises:
    matching transport network characteristic values towards radio coordination requirements.

3. The method according to claim 1, wherein the retrieving comprises:
    measuring transport network characteristics between one or more Radio Coordination neighbours.

4. The method according to claim 1, wherein the validity checking further comprises:
    checking periodically the validity of the active Radio Coordination scheme.

5. The method according to claim 1, wherein the validity checking further comprises:
    determining whether any radio coordination scheme is used; and
    determining whether maximal performance radio coordination scheme(s) are used and optimally configured.

6. The method according to claim 1, wherein updating the active Radio Coordination scheme further comprises:
    determining whether a maximal performance Radio Coordination scheme is used.

7. The method according to claim 1, wherein updating the active Radio Coordination scheme further comprises:
    selecting a Radio Coordination scheme to be active.

8. The method according to claim 1, wherein updating the active Radio Coordination scheme further comprises:
    reconfiguring the active Radio Coordination scheme according to the retrieved transport network characteristic values.

9. A node for adapting Radio Node Radio Coordination schemes based on transport network characteristics of a connection between neighbouring radio nodes, the node comprising:
    a processor;
    a non-transitory computer readable storage medium having instructions stored therein which, when executed by the processor, causes the node to:
    detect new radio node neighbours, the radio node and radio node neighbours part of at least one radio access network providing service to at least one user equipment;
    retrieve transport network characteristics values for the connection between radio node neighbours of the at least one radio access network;
    validity check an active Radio Coordination scheme based on the retrieved transport characteristics values, the Radio Coordination scheme used to coordinate communication between the radio node and radio neighbours and the at least one user equipment; and
    in response to an outcome of the validity checking, update the active Radio Coordination scheme based on the retrieved transport characteristics values for the connection between the radio node neighbours.

10. The node according to claim 9, wherein the instructions which, when executed by the processor, further cause the node to match transport network characteristic values towards radio coordination requirements.

11. The node according to claim 9, wherein the instructions which, when executed by the processor, further cause the node to measure transport network characteristics between one or more Radio Coordination neighbours.

12. The node according to claim 9, wherein the instructions which, when executed by the processor, further cause the node to check periodically the validity of the active Radio Coordination scheme.

13. The node according to claim 9, wherein the instructions which, when executed by the processor, further cause the node to validity check by checking if any radio coordination scheme is used, and if maximal performance radio coordination scheme(s) are used and optimally configured.

14. The node according to claim 9, wherein the instructions which, when executed by the processor, further cause the node to determine whether a maximal performance Radio Coordination scheme(s) is used.

15. The node according to claim 9, wherein the instructions which, when executed by the processor, further cause the node to select a Radio Coordination scheme to be active.

16. The node according to claim 9, wherein the instructions which, when executed by the processor, further cause the node to reconfigure the active Radio Coordination scheme according to the retrieved transport network characteristic values.

17. A non-transitory computer-readable storage medium having computer code stored therein, which when executed by a processor of a node, causes the node to perform operations comprising:

detecting new radio node neighbours, the radio node and radio node neighbours part of at least one radio access network providing service to at least one user equipment;

retrieving transport network characteristics values for a connection between radio node neighbours of the at least one radio access network;

validity checking of an active Radio Coordination scheme based on the retrieved transport network characteristics values, the Radio Coordination scheme used to coordinate communication between the radio node and radio node neighbours and the at least one user equipment; and in response to an outcome of the validity checking, updating the active Radio Coordination scheme based on the retrieved transport network characteristics values for the connection between the radio node neighbours.

18. The non-transitory computer-readable storage medium according to claim 17, further comprising computer code which, when executed by the processor of the node, causes the node to measure transport network characteristics between one or more Radio Coordination neighbours.

* * * * *